United States Patent Office 3,798,117
Patented Mar. 19, 1974

3,798,117
LAMINATE COMPRISING PIGMENTED MELAMINE RESIN MODIFIED NITRILE RUBBER IMPREGNATED BASE AND SUPERIMPOSED FILM
Alfred Thomas Guertin, Ronald James Keeling, and Walter William Schiermeier, Cincinnati, Ohio, assignors to Formica Corporation, Cincinnati, Ohio
No Drawing. Filed Mar. 15, 1972, Ser. No. 235,043
Int. Cl. B32b 27/42
U.S. Cl. 161—251      7 Claims

ABSTRACT OF THE DISCLOSURE

A decorative laminate comprising a heat and pressure consolidated assembly comprising in superimposed relationship at least one dried paper base sheet impregnated with a pigmented mixture of a nitrile rubber latex and a water dispersible melamine-formaldehyde resin surfaced with a thermoplastic film back-printed with a design thereby rendering the film translucent or a thermoplastic film pigmented so as to render it translucent.

BACKGROUND OF THE INVENTION

Decorative laminates have been produced for a substantial plurality of years for use as surface materials for the application to tables, vanitories, vertical wall coverings, door coverings and the like. Ordinarily, these decorative laminates are prepared by assembling in superimposed relationship a plurality of kraft paper core sheets which have been impregnated with a thermosetting phenolformaldehyde resin. Superimposed above these core sheets which may number between 1 and 9 core sheets there is positioned a decorative sheet that is impregnated with a thermosetting resin which does not undergo any noticeable deterioration in color, such as darkening, upon the subsequently applied laminating conditions. Typical resins that meet this description are the melamine-formaldehyde resins, the epoxy resins, the unsaturated polyester resins, the urea resins, and the like. The decorative sheet may be a solid color α-cellulose paper sheet which has been dyed or pigmented to a selected color such as white, pink, yellow, and the like, or the decorative sheet may be a print sheet in which some design such as a geometric design or a floral design or a wood print is imparted to the decorative side of the decorative sheet before or after impregnation with the color stable thermosetting resin. Frequently, there is superimposed above the decorative sheet an overlay sheet which is a sheet of fine quality paper such as α-cellulose paper sheet unpigmented, but impregnated again with a color stable thermosetting resin, which overlay sheet is superimposed above the decorative sheet, and then the entire assembly is heat and pressure consolidated under conventional conditions of pressure and temperature to produce a unitary laminated product. The overlay is used primarily when the decorative sheet is a print sheet so as to provide a barrier to avert abrasion of the printed part of the print sheet and thus preserve its printed characteristics intact for prolonged periods of time. More recently, a structure such as that described hereinabove has had the overlay replaced with certain selected thermoplastic films produced from vinyl polymers such as films of poly(methyl methacrylate), blends of poly(methyl methacrylate) with polyvinylidene fluoride, polyvinyl fluoride, and the like.

FIELD OF THE INVENTION

The concept of the present invention is in the field of making laminated plastic articles and, more particularly, decorative, flexible, laminated plastic articles which laminated articles provide better solvent resistance, improved impact resistance, better glueability, more body, less telegraphing of substrate defects, greater flexibility, and improved handleability, and when used in combination with an aluminum foil positioned immediately beneath the decorative sheet to provide a surface with improved heat dissipation and, finally, absence of blooming but superior to those disclosed in the U.S. Pat. 3,547,767 in general appearance, opacity, resistance to the deleterious effects of exposure to high humidity, internal bond and stiffness.

DESCRIPTION OF THE PRIOR ART

The known prior art is to be found in the U.S. Pats. 2,260,239, 2,563,111, 2,729,585, 2,759,866 and 3,231,457, 3,547,767 all of which are incorporated herein by reference.

SUMMARY OF THE INVENTION

This invention relates to a decorative laminate which has at least two layers, which layers are arranged in superimposed relationship and then heat and pressure consolidated to a unitary structure. The lower layer of this two-component laminate is sometimes hereinafter referred to as the base member and comprises at least one sheet of paper and, preferably, unbleached kraft paper which has been impregnated with a pigmented nitrile rubber latex composition. The nitrile rubber composition used in the present invention is a pigmented resin blend containing at least three, and preferably four, essential components. The first essential component is a nitrile rubber latex and will be present in the pigmented resin blend in an amount varying between about 20% to about 93% by weight based on the total weight of the resin blend. The second essential component is a water dispersible melamine formaldehyde resin of which a substantial plurality are available commercially and these melamine-formaldehyde resins will be present in an amount varying between about 5% and 20% by weight based on the total weight of the pigmented resin blend. The third essential ingredient is a water dispersible pigment which should be present in an amount varying between about 2% and 20% by weight based on the total weight of the pigmented resin blend solids. Obviously, these percentages must add up to 100%. A fourth optional but preferred ingredient is a polyvinyl halide latex which, although it can be omitted and, therefore, be present in an amount of 0% by weight, can be present in quantities up to about 73% by weight of the polyvinyl halide latex based on the total weight of the pigmented resin blend. As before, when the polyvinyl halide latex is used, all of the percentages of the four ingredients must add up to 100%. When such a pigmented resin blend is prepared, it is then ready for use to impregnate the paper web. Upon completion of the impregnation of the paper web, which incidentally, can be impregnated continuously, the aqueous portion of the latex or emulsion is then flashed off by passing the impregnated wet web through a heating chamber or oven or it may be passed through a plurality of heated rolls whereby the temperature is sufficient to evaporate the water from the web thereby leaving the nitrile rubber composition present on and/or in the dried web. The dried web thus produced is ready to be cut into the desired sizes and positioned in the assembly preparatory to making the laminate. The paper of the base sheet is a special highly porous saturating grade unbleached kraft paper with a basis weight between about 30 lbs. to 130 lbs. (3000 sq. ft. ream size) and preferably between about 70 lbs. to 100 lbs. The Gurley porosity of the base sheet is less than 5 seconds/100 ml. air/sq. in.

The first component used in the composition is a nitrile rubber. These nitrile rubbers may be acquired from a plurality of commercially available sources and are copolymers of either acrylonitrile and/or methacrylonitrile with a copolymerizable rubber latex forming monomer such as one or more of the butadienes. If desired, one may use a terpolymer of the type of rubber latex which is prepared by interpolymerizing acrylonitrile and/or methacrylonitrile with one or more of the butadienes and one or more of the polymerizable styrenes such as styrene per se or the ring-substituted alkyl styrenes such as o-, m-, p-methyl styrene, and/or the ring-substituted halostyrenes such as the chloro and bromo ring-substituted styrenes and the like. It is preferred to make use of a nitrile rubber latex which is prepared by copolymerizing butadiene and acrylonitrile in a conventional latex or emulsion polymerization technique in which the copolymer contains between about 20 and 50 parts by weight of acrylonitrile and, correspondingly, between 80 and 50 parts of butadiene and, preferably, between about 25 and 35 parts, by weight, of acrylonitrile and, correspondingly, from about 75 to about 65 parts, by weight, of butadiene. As used, the nitrile rubber latex in the aqueous dispersion may contain between about 35% and 55%, by weight, of solids based on the total weight of the latex and, preferably, between about 45% and 50%, by weight, solids same basis.

The second component is a water dispersible melamine-formaldehyde resin. These water dispersible melamine-formaldehyde resins that are used in the resin blend of the present invention are readily available commercially from a plurality of sources and have been disclosed in a large number of U.S. patents such as the U.S. Pat. 2,197,-357 or 2,260,239 each of which patents is incorporated herein by reference. Since these resins are commercially available from a plurality of different sources further discussion thereof is deemed to be unnecessary. However, they are used in the amounts varying between about 5% and 20% by weight based on the total weight of the blend.

The third essential ingredient is any one of a number of water-dispersible pigments which will be used in amounts varying between about 2% and 20% by weight based on the total weight of the pigmented resin blend solids. These pigments are commercially available water dispersible types such as those manufactured by the Cal/Ink Division of Tenneco Chemicals and the Harshaw Chemical Company. The water dispersible pigments are recommended for in-plant tinting and emulsions such as the latex saturating system comprising the blend of the nitrile rubber latex and the melamine-formaldehyde resin described hereinabove. The pigment systems contain a vehicle and water solvent in addition to the pigments such as $T_1O_2$, burnt umber, yellow iron oxide, indian red, raw umber, phthalo green, chromium oxide, ultra blue, toluidine red, red iron oxide, chrome yellow medium, perma-cal yellow, lamp black and the like. The amount of pigment solids in the water dispersions varies with color and may be 15–75% by weight based on the total weight of pigment and water.

These pigments are added to the resin blend for the purpose of rendering the impregnated dried base sheet opaque. In the absence of the pigment, the resin impregnated dried base sheet is highly translucent because the refractive indices of the paper fibers and the resin blend are nearly the same.

As a preferred embodiment, one may blend into the nitrile rubber latex composition as the fourth component up to 75 parts, by weight, of a polyvinyl halide latex such as a polyvinyl chloride latex. These polyvinyl halide latices can be prepared by homopolymerizing a vinyl halide or by copolymerizing it with another compatible and copolymerizable monomer in an emulsion or latex emulsion system. The term vinyl halide is deemed to be of sufficient scope to encompass the vinylidene halides as well which can be used as homopolymers or copolymers with one or more compatible monomers copolymerizable therewith in an emulsion or latex polymerization system. Among the vinyl halides which may be used to form this polyvinyl halide latex are vinyl chloride, vinyl fluoride, vinyl bromide, vinyl iodide, vinylidene chloride, vinylidene fluoride, vinylidene bromide, vinylidene iodide, an the like. Among the polymerizable monomers which may be used to form copolymers, terpolymers, and the like with the vinyl halide are such polymerizable monomers as vinyl acetate, styrene, the ring-substituted halo and alkyl substituted styrenes, such as o-, m-, p-chloro styrene, o-, m-, p-bromo styrene, and the like, or the 2,4-dichlorostyrene, 2,5-dichloro styrene, 3,4-dibromo styrene, and the like. Additionally, one could use the o-, m-, p-methyl styrene, o-, m-, p-ethyl styrene, and the like or the 2,4-dimethyl styrene, the 2,5-diethyl styrene, and the like. One may use additionally such polymerizable monomers as acrylic acid, methacrylic acid, ethacrylic acid and their esters such as the methyl, ethyl, isopropyl, butyl acrylates, methacrylates or ethacrylates. It is ordinarily desired that there be used a predetermined amount of the vinyl halide in the copolymer such as about 75 parts of the vinyl halide and, correspondingly, about 25 parts of the corresponding copolymerizable monomers. A particularly useful polyvinyl halide copolymer latex is one prepared by emulsifying 95 parts of vinyl chloride with 5 parts of ethyl acrylate, which copolymer contains no conventional non-polymeric plasticizers. This vinyl latex may be present in an amount varying between 0% and 73%, whereas the nitrile rubber latex may be present correspondingly in an amount varying between 93% and 20%, by weight, based on the total weight of solids constituents in the latex.

It is preferred to use in the blend from about 40% to about 60%, by weight, of the vinyl latex and, correspondingly, from about 60% to about 40%, by weight, of the nitrile rubber latex, same basis as before. It will be apparent that when percentages, by weight, in the total blend are given in corresponding terms, it is obvious that the total amount of the separate components are additively 100%.

The filler paper used in the base member will be a conventional type of absorbent filler paper, of which a plurality are available commercially such as the unbleached high porosity kraft paper having an apparent density of about 0.5 g./cc. The base paper is treated with the nitrile rubber resin blend composition using typical paper saturating techniques to a resin pick-up within the range of from about 45 to about 75%, by weight, based on the total weight of the impregnated dried paper and, preferably, between about 50% and 68%, by weight, of the resin solids based on the total weight of the impregnated dried paper. The base paper thus treated and dried provides a stable, tackfree sheet.

The base sheet is then surfaced with a transparent thermoplastic film back-printed with a design or such a film pigmented to provide a solid color thereby rendering the film translucent to opaque. The expression "back-printed" means printed on its back or underside which side will contact the base sheet. The thermoplastic transparent film used as the surface layer may be any transparent colorless thermoplastic film containing no plasticizer or plasticized very lightly with a non-migratory polymeric plasticizer, including such plasticizers as rubbery polymers and copolymers. The essential feature of this thermoplastic film is to impart to the laminate surface a good stain and solvent resistance. Any film containing a plasticizer which impairs this resistance is therefore not acceptable. Additionally, any thermoplastic film which is soluble in common solvents to any significant extent such as alcohols, acetates, carbon tetrachloride, and the like, are unacceptable. The thickness of the surface film is not critical, but economics and commercial availability tend to dictate that the film be selected from those having a thickness between about 0.5 and 6 mils and, preferably, between about 2 and 4 mils. Illustrative of the type of thermoplastic transparent films which may be used for the surface layer of the laminates of the present invention are polyvinyl chloride films, either plasticized lightly or unplasticized films of polyacrylonitrile, films of nylon, films of chlorinated polyethers, films of polyesters, films of polycarbonates, films of poly (methyl methacrylate), films of blends of poly (methyl methacrylate) with polyvinylidene fluoride and films of poly-ionomers of Du Pont Surlyn A, which is a commercially available copolymer of ethylene copolymerized with a monomer containing carboxyl groups to provide an ionically reactive site. One of the preferred vinyl films which may be used to surface the laminate of the present invention is polyvinyl chloride which may be used as a homopolymer or as a copolymer prepared by copolymerizing vinyl chloride with minor amounts such as 15% or less of the acrylates such as methyl acrylate, ethyl acrylate, propyl acrylates, butyl acrylates, methyl methacrylate, ethyl methacrylate, methyl ethacrylate, ethyl ethacrylate, vinyl acetate, vinyl propionate, and the like. In addition, the polyvinyl chloride homopolymer may be blended with minor amounts such as 15% of a polymeric processing aid such as polymers or copolymers of the acrylates such as methyl acrylate, ethyl acrylate, propyl acrylate, butyl acrylate, methyl methacrylate, ethyl methacrylate, methyl ethacrylate, vinyl acrylate, etc. these surfacing films may contain, if desired, small quantities of plasticizer in an amount of 5% or less such as commercially available epoxy ester metal salts, urethane extended epoxies and other conventional plasticizers such as dibutyl phthalate, dioctyl phthalate, and the like.

In producing the decorative laminates of the present invention, a variety of press cycles may be used such as by varying the pressure between about 200 and 1400 p.s.i. with temperatures between about 100° C. and 260° C. and press times from about five seconds to about 30 minutes. Ordinarily, the time factor diminishes as the temperatures and pressures are increased and vice-versa. A press cycle of 400 p.s.i. and 135° C. for 15 minutes is preferred. If a fully flexible laminate is desired, the core sheets should be eliminated altogether or kept to a minimum such as between about 1 and 4 core sheets as hereinabove defined or between about 1 and 4 sheets similar to the base sheet hereinabove defined. Laminates prepared by increasing the number of core sheets from 1 to 4 all gave satisfactory products but with slightly increased stiffness with the increased number of core sheets. If flexibility of the laminate is less important than rigidity, a plurality of core sheets even in excess of 4 can be used up to about 8 or 9, but beyond that, nothing of significance is to be gained by increasing the total number of core sheets.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

A laminate is prepared by using a two mil thick transparent rigid unplasticized polyvinyl chloride film back printed with a wood grain design over a base sheet of 92 lbs. (basis weight/3,000 square feet ream size) of unbleached absorbent kraft paper with a Gurley porosity of 3 sec./100 ml. air/sq. in. treated to a resin level of 50% with a pigmented resin blend of 46 parts of a commercially available polyvinyl chloride latex, 38 parts of a commercially available nitrile rubber latex, 10 parts of a commercially available water soluble melamine-formaldehyde resin and 6 parts of a water dispersible brown colored pigment. The back printed film and the impregnated base sheet are arranged in superimposed relationship and are laminated together at a maximum temperature of 135° C., at 400 p.s.i. for 15 minutes in a plate pack in a hydraulic laminating press. A plurality of these laminates were pressed simultaneously and were separated from one another by suitable release sheets and each decorative side was positioned against a polished steel plate covered with a release sheet. The laminates produced were removed from the press and were separated from the release sheets and the steel plates and were then subjected to a plurality of tests. The results of these tests are shown in Table I hereinbelow.

TABLE I

| Property | Test method | Value, Example 1 |
| --- | --- | --- |
| Thickness | | .0013". |
| Abrasion resistance | NEMA LD 1-2.01 | 290 cycles, .055 rate of wear. |
| | CS-17 | 3,300 cycles, .0047 rate of wear. |
| Impact resistance | NEMA LD 1-2.15 | 115". |
| Dimensional change | NEMA LD 1-2.08 | 0.1% length, 0.4% width. |
| Steam exposure—hr. to show whitening. | Sample placed face downwards 6" over surface of boiling water. | 24 hrs. N.E. |
| Stain resistance | NEMA LD 1-2.05 | None except gloss increase with acetone and amyl acetate. |
| Colorfastness | NEMA LD 1-2.06 | No effect. |
| Water boil | NEMA LD 1-2.02 | 45% water absorp., 37% thick. swell. |
| Peel strength | | 3.3 lbs./in. at 90°, 4.6 lbs./in. at 180°. |
| Formability | NEMA LD 1-2.11 | 1/16 in. min. radius at 70° F. |
| Internal bond (shear) | | 620 lbs./sq. in. |
| Gloss | 60° Gardner gloss meter. | 6–20. |
| Smoothness | | Fine. |
| Appearance on high humidity exposure. | 24 hrs. at 85% R.H. | No effect. |
| Light transmission | | Opaque. |
| Stiffness | Ring flexure (15" circumference ring). | 30 gms. at 6 cm. |

EXAMPLE 2

Example 1 is repeated in all essential details except that the back printed film is replaced by a 4 mil thick rigid unplasticized polyvinyl chloride film containing sufficient titanium dioxide pigment so as to render the film translucent but nearly opaque. The properties of this laminate are the same as those of the laminates of Example 1 except that the laminate is 14 mils thick.

COMPARATIVE EXAMPLE 3

Example 1 is repeated in all essential details except that the impregnating resin used for the base sheet was a polyblend resin of 55 parts of the same polyvinyl chloride latex and 45 parts of the same nitrile rubber latex as is disclosed in the U.S. Pat. 3,547,767. It should be noted that there is no melamine formaldehyde resin and no pigment used in this polyblend resin. The laminates produced were inferior to those in Example 1 in several respects as is shown in Table II set forth hereinbelow.

TABLE II

| | | Values | |
| --- | --- | --- | --- |
| Property | Test method | Example 1 | Example 3 |
| Water boil | NEMA LD 1-2.02. | 45% water abs., 37% thick. swell. | 57% water abs., 45% thick swell. |
| Internal bond (shear). | | 620 lbs./sq. in. | 500 lbs./sq. in. |
| Appearance on high humidity exposure. | 24 hr. at 85% R.H. | No effect | Dimpled. |
| Light transmission. | | Opaque | Translucent. |
| Stiffness | Ring flexure (15" circumference ring). | 30 gms. at 6 cm. | 21 gms. at 6 cm. |

COMPARATIVE EXAMPLE 4

Example 1 is again repeated in all essential details except that the impregnating resin for the base sheet was polyblend resin of 49.5% of the same polyvinyl chloride latex, 40.5% of the same nitrile rubber latex and 10% of the same water soluble melamine formaldehyde resin. The properties of the two laminates are comparable to those produced in Example 1 except that they are slightly translucent rather than opaque.

COMPARATIVE EXAMPLE 5

Example 1 is repeated in all essential details except that the impregnating resin used for the base sheet was a pigmented polyblend resin containing 51% of the same polyvinyl chloride latex and 43% of the same nitrile rubber latex and 6% of the same brown colored water dispersible pigment. The water soluble melamine formaldehyde was omitted. The properties of these laminates are the same as those of Example 1 except that humidity resistance and stiffness are decreased and water absorption is increased.

EXAMPLE 6

Example 1 is repeated in all essential details except that the resin pickup is 68%. The properties of these laminates are the same as those of Example 1 as is shown in Table I except that the laminates are 14 mils thick and the water absorption is lowered to 35%.

EXAMPLE 7

Example 1 is repeated in all essential details except that the impregnating resin used in the base sheet is a pigmented resin blend containing 84% of a nitrile rubber latex composition of a co-polymer of 28 parts of acrylonitrile and 72 parts of butadiene, 10 parts of the same water soluble melamine-formaldehyde resin and 6 parts of the same brown colored water dispersible pigment. The properties of the laminates thus produced are substantially the same as those produced in Example 1.

COMPARATIVE EXAMPLE 8

Example 1 is again repeated in all essential details except that a conventional unbleached saturating grade of kraft paper having a basis weight of 95 lbs. (per 3,000 sq. ft. ream size) and having Gurley porosity of 10 seconds 100 ml. air is used. The base paper is found to be poorly impregnated. Most of the resin resides on the surfaces of the paper, while the center of the paper is essentially free of resin or resin starved. The properties of the laminates ultimately produced are inferior to those of Example 1 in water absorption and internal bond as shown in Table III hereinbelow. It should be noted, however, that the peel strength is improved.

TABLE III

| Property | Test method | Values | |
|---|---|---|---|
| | | Example 1 | Example 8 |
| Water boil | NEMA LD 1-2.02. | 45% water abs., 37% thick. swell. | 65% water abs., 50% thick. swell. |
| Internal bond (shear). | | 620 lbs./sq. in. | 300 lbs./sq. in. |
| Peel strength | | 3.3 lbs./in. at 90°. | 3.61 lbs./in. at 90°. |
| Appearance on exposure. | 24 hr. at 85% R.H. | No effect | Dimpled. |

COMPARATIVE EXAMPLE 9

Example 1 is again repeated in all essential details except that the resin pick-up is reduced to 40%. The laminates have poorer peel strength (1.5 lbs./in. width) and water absorption is increased to 52%.

EXAMPLE 10

Example 2 is repeated in all essential details except that the surface release sheets are removed and the surface film is pressed directly against the polished steel plate. The resulting laminates are very glossy and have a "wet-look."

EXAMPLE 11

Example 1 is repeated in all essential details except that the film is back printed with a leather design and the release sheet used between the polished steel plate and the film has a leather texture. The laminate has the look and feel of leather and its physical properties are substantially the same as those in Example 1.

COMPARATIVE EXAMPLE 12

Example 1 is repeated in all essential details except that the impregnating resin is a pigmented resin blend of 35% by weight of the same polyvinyl chloride latex and 29% by weight of the same nitrile rubber latex and 30% by weight of the same water soluble melamine formaldehyde resin and 6% of the same brown water dispersible pigment. The laminates thus produced are inferior to those of Example 1 in the respects shown in Table IV set forth hereinbelow.

TABLE IV

| Property | Test method | Values | |
|---|---|---|---|
| | | Example 1 | Example 12 |
| Impact resistance. | NEMA LD 1-2.15. | 115″ | 60″. |
| Dimensional change. | NEMA LD 1-2.08. | 0.1% length, 0.4% width. | 0.4% length, 0.8% width. |
| Water boil | NEMA LD 1-2.02. | 45% water abs., 37% thick. swell. | 33% water abs., 25% thick. swell. |
| Peel strength | | 3.3 lbs./in. at 90°, 4.6 lbs./in. at 180°. | 2.7 lbs./in. at 90°, 3.7 lbs./in. at 180°. |
| Formability | Min. radius at 70° F. | 1/16″ | 1/8″. |
| Stiffness | Ring flexure (55″ circumference ring). | 30 | 50. |

EXAMPLE 13

Example 1 is repeated in all essential details except that in the place of the 2 mil polyvinyl chloride film there is substituted a 2 mil transparent film of nylon backprinted with a floral design. A further difference resided in the fact that the laminate was processed in a continuous laminating operation using the apparatus shown in the U.S. Pat. 3,159,526. The final laminate has superior scratch and stain resistance.

EXAMPLE 14

Example 1 is repeated in all etssential details except that the polyvinyl chloride surface film is replaced with a clear nylon film back-printed with a wood grain design and the entire assembly is heat and pressure consolidated into a unitary structure by the process of Example 1. The properties of this laminate are essentially the same as those of Example 1 except for superior scratch and solvent resistance.

EXAMPLE 15

Example 14 is repeated in all essential details except that the clear nylon film is replaced by a back-printed clear film of unplasticized polyvinylidene chloride of the same thickness. The properties of this laminate are comparable to those described in Example 1.

EXAMPLE 16

Example 14 is repeated in all essential details except that the nylon film surface layer is replaced by a commercially available clear film of polycarbonate back-printed with a wood grain design. The properties of the laminate are similar to Example 1 except for reduced stain resistance.

EXAMPLE 17

Example 14 is repeated in all essential details except that the clear nylon film is replaced by a clear film of a commercially available polyester resin back-printed with a wood grain design. The properties of this laminate are similar to those described in Example 1.

EXAMPLE 18

Example 1 is repeated in all essential details except that a bondable aluminum foil is positioned between the decorative film and the base layer. The properties of the laminate thus produced are comparable to those of Example 1 except for the greatly enhanced thermal properties, namely, heat and cigarette burn resistance.

EXAMPLE 19

Example 1 is repeated in all essential details except that the layers are formed into a uniform product by exerting a pressure of 300 p.s.i. The properties of this laminate are favorably comparable to those of Example 1.

EXAMPLE 20

Example 14 is repeated in all essential details except that the nylon surface film is replaced by a clear back-printed film comprising a blend of 60 parts of poly (methyl methacrylate) and 40 parts of polyvinylidene fluoride of the same thickness. The properties of this laminate are comparable to those produced in Example 1 except for the improved outdoor weatherability.

EXAMPLE 21

Example 1 is repeated in all essential details except that under the base sheet there is positioned a rigid wooden board and the lamination is accomplished in one step with the use of a continuous laminating press comparable to that used in Example 13.

EXAMPLE 22

Example 21 is repeated in all essential details except that lamination of the base sheet, surface sheet, and rigid wooden board are accomplished in a single step in a hot press at 140° C. under 400 p.s.i. for 60 seconds.

EXAMPLE 23

Example 1 is repeated in all essential details except that a plurality of the laminates were pressed simultaneously in a plateless pack. They were separated from one another by suitable release sheets to provide a desired texture or gloss on the surface and suitable back release without causing later adhesion interference. The properties of the resultant laminates were substantially identical to Example 1 except for smoothness. The surface had a light pebbled or orange-peel texture.

We claim:

1. A flexible heat and pressure consolidated decorative laminate comprising in superimposed relationship at least one dried paper base sheet impregnated with from about 45% to about 75% by weight based on the total weight of the impregnated dried sheet of a nitrile rubber resin blend containing (1) from about 20% to 93% by weight of nitrile rubber latex; (2) from about 5% to 20% by weight of a water dispersible melamine-formaldehyde resin; (3) from about 2% to 20% by weight of a water dispersible pigment; and (4) a polyvinyl halide latex present in an amount up 73% by weight, said percentages by weight in said resin blend being based on the total weight of the blend, solids basis, and totaling 100%, said base sheet having superimposed thereon a thin transparent thermoplastic surface film containing not more than about 5% by weight of a plasticizer, back-printed with a design or is pigmented thereby rendering the film translucent, wherein the paper used as the base sheet is originally a highly porous saturating grade of unbleached kraft paper with a basis weight between about 30 pounds to 130 pounds (3000 sq. ft. ream size) and a Gurley porosity of less than about 5 seconds/100 ml. air/sq. in.

2. A decorative laminate according to claim 1 in which the thermoplastic surface film is an unplasticized polyvinylchloride film.

3. A decorative laminate according to claim 1 in which the thermoplastic surface film has a thickness between about 0.5 and 6 mils.

4. A decorative laminate according to claim 1 in which the thermoplastic surface film has a thickness between about 2 and 4 mils.

5. A decorative laminate according to claim 1 in which the thermoplastic surface film is an unplasticized polyvinylchloride film having a thickness between about 0.5 and 6 mils.

6. A decorative laminate according to claim 1 in which the thermoplastic surface film is an unplasticized polyvinyl chloride film having a thickness between about 2 and 4 mils.

7. A decorative laminate according to claim 1 in which there is positioned, immediately below the surface film, a metal foil.

References Cited
UNITED STATES PATENTS

| | | | |
|---|---|---|---|
| 2,931,782 | 4/1960 | Jarrett | 260—29.4 UA |
| 3,165,423 | 1/1965 | Caldwell et al. | 260—29.4 UA |
| 3,177,055 | 4/1965 | Ruckle et al. | 260—29.4 UA |
| 3,256,234 | 6/1966 | Miller | 260—29.4 UA |
| 3,547,767 | 12/1970 | Keeling et al. | 161—248 |
| 3,701,706 | 10/1972 | Giddings et al. | 161—248 |

GEORGE F. LESMES, Primary Examiner

S. S. SILVERMAN, Assistant Examiner

U.S. Cl. X.R.

161—248, 254, 263, 413; 260—29.4 UA

UNITED STATES PATENT OFFICE
CERTIFICATE OF CORRECTION

Patent No. 3,798,117      Dated March 19, 1974

Inventor(s) ALFRED THOMAS GUERTIN, RONALD JAMES KEELING & WALTER WILLIAM SCHIERMEIER It is certified that error appears in the above-identified patent and that said Letters Patent are hereby corrected as shown below:

1. Column 1, the title. Delete the title "LAMINATE COMPRISING PIGMENTED MELAMINE RESIN MODIFIED NITRILE RUBBER IMPREGNATED BASE AND SUPERIMPOSED FILM" and substitute in place therefor the following: --FLEXIBLE HEAT AND PRESSURE CONSOLIDATED DECORATIVE LAMINATE COMPRISING A PIGMENTED MELAMINE RESIN MODIFIED NITRILE RUBBER LATEX IMPREGNATED BASE AND A SUPERIMPOSED THERMOPLASTIC FILM--.

3. Column 8, Table IV, under the heading "Test method", next to last line, and last line. Delete the phrase "(55" circumference ring)" and substitute in the place therefor the following: --(15" circumference ring)--.

4. Column 10, line 3. Delete the phrase "up 73%" and substitute in the place therefor the following: --up to 73%--.

5. Column 6, Table I, under heading "Value, Example 1", first line. Delete the number ".0013"' and substitute in the place therefor the following: --0.013"--.

Signed and sealed this 1st day of October 1974.

(SEAL)
Attest:

M. GIBSON JR.
Attesting Officer

C. MARSHALL DANN
Commissioner of Patents

UNITED STATES PATENT OFFICE
ADDITIONAL CERTIFICATE OF CORRECTION

Patent No. 3,798,117            Dated March 19, 1974

Inventor(s) ALFRED THOMAS GUERTIN, RONALD JAMES KEELING & WALTER WILLIAM SCHIERMEIER It is certified that error appears in the above-identified patent and that said Letters Patent are hereby corrected as shown below:

1. Column 3, Line 44.    Delete the word "and" and substitute in the place therefor the following: --of--.

Signed and sealed this 12th day of November 1974.

(SEAL)
Attest:

McCOY M. GIBSON JR.            C. MARSHALL DANN
Attesting Officer               Commissioner of Patents